3,288,808
BENZOTHIENYL CARBAMATES
John R. Kilsheimer, Westfield, and Harold A. Kaufman,
Piscataway Township, New Brunswick, N.J., assignors
to Mobil Oil Corporation, a corporation of New York
No Drawing. Filed Jan. 21, 1965, Ser. No. 427,089
9 Claims. (Cl. 260—330.5)

This application is a continuation-in-part of copending application Serial No. 334,581, filed December 30, 1963, now abandoned, which in turn is a continuation-in-part of copending application Serial No. 220,073, filed August 28, 1962, now abandoned.

This invention relates to the production of new and useful chemical compounds. More particularly, it is concerned with carbamates of benzothiophenes.

It is one of the objects of this invention to prepare new chemical compounds. It is another object to prepare various alkyl, alkenyl and aryl carbamates of benzothiophenes. It is still another object to prepare compounds having insecticidal or other biological activity. A more specific object is to provide insecticidal compositions containing such compounds. Other objects and advantages of this invention will become apparent to those skilled in the art, from the detailed description which follows:

The present invention provides N-alkyl, N-alkenyl and N-aryl carbamates of benzothiophenes having the following generic formula:

$$\begin{array}{c} W \\ \| \\ OCNRR' \end{array}$$

(structure with benzothiophene ring positions 2-7, substituents X, Y, Z, and $O_n$)

where R is selected from H, alkyl ($C_1$–$C_8$), cycloalkyl ($C_3$–$C_6$), and alkenyl ($C_2$–$C_8$); R' is selected from H, alkyl ($C_1$–$C_8$), alkenyl ($C_2$–$C_8$); phenyl, and halophenyl; X, Y, and Z are selected from hydrogen, halogen, nitro, alkyl ($C_1$–$C_4$), alkenyl ($C_2$–$C_4$), di($C_1$–$C_2$)alkylamino, methylmercapto, cyano (—CN), thiocyano (—SCN), alkoxy (—$OCH_3$ to —$OC_8H_{17}$); W is selected from O and S; $n=0$, 1 or 2, i.e. $n$ is 0–2; and in which the carbamate radical (—OCWNRR') and X, Y, and Z may be on any separate 2–7 positions of the ring; and the partially hydrogenated derivatives of said carbamates.

The following are typical of compounds of this invention corresponding to the above generic formula:

2-benzothienyl-N-methylcarbamate
3-benzothienyl-N-methylcarbamate
4-benzothienyl-N-naphthylcarbamate
5-benzothienyl-N-methylcarbamate
6-benzothienyl-N-methylcarbamate
7-benzothienyl-N-methylcarbamate
7-dimethylamino-4-benzothienyl-N-methylcarbamate
7-diethylamino-4-benzothienyl-N-methylcarbamate
3-dimethylamino-4-benzothienyl-N-methylcarbamate
6-methyl-7-dimethylamino-4-benzothienyl-N-methylcarbamate
3-isopropoxy-4-benzothienyl-N-methylcarbamate
7-isopropoxy-4-benzothienyl-N-methylcarbamate
6-methyl-7-methoxy-4-benzothienyl-N-methylcarbamate
3-methyl-4-benzothienyl-N-methylcarbamate
7-ethyl-4-benzothienyl-N-methylcarbamate
2-ethyl-4-benzothienyl-N-methylcarbamate
7-methylmercapto-4-benzothienyl-N-methylcarbamate
5-allyl-4-benzothienyl-N-methylcarbamate
7-nitro-4-benzothienyl-N-methylcarbamate
2-cyano-4-benzothienyl-N-methylcarbamate
7-cyano-4-benzothienyl-N-methylcarbamate
7-thiocyano-4-benzothienyl-N-methylcarbamate
2-chloro-4-benzothienyl-N-methylcarbamate
3-chloro-4-benzothienyl-N-methylcarbamate
5-chloro-4-benzothienyl-N-methylcarbamate
6-chloro-4-benzothienyl-N-methylcarbamate
7-chloro-4-benzothienyl-N-methylcarbamate
2,3-dichloro-4-benzothienyl-N-methylcarbamate
2,3,5,6,7-pentachloro-4-benzothienyl-N-methylcarbamate
2-iodo-4-benzothienyl-N-methylcarbamate
3-bromo-4-benzothienyl-N-methylcarbamate
3-benzothienyl-N-ethylcarbamate
4-benzothienyl-N-2-ethylhexylcarbamate
4-benzothienyl-N-n-butylcarbamate
4-benzothienyl-N-n-octylcarbamate
4-benzothienyl-N,N-dimethylcarbamate
4-benzothienyl-N-phenylcarbamate
4-benzothienyl-N-chlorophenylcarbamate
4-benzothienyl-N-phenylthionocarbamate
1,1-dioxy-4-benzothienyl-N-methylcarbamate
1,1-dioxy-3-benzothienyl-N-methylcarbamate
1-oxy-4-benzothienyl-N-methylcarbamate
1-oxy-3-benzothienyl-N-methylcarbamate
4,5,6,7-tetrahydro-4-benzothienyl-N-methylcarbamate
2,3-dihydro-4-benzothienyl-N-methylcarbamate
2,3-dihydro-7-methyl-4-benzothienyl-N-methylcarbamate
2,3-dihydro-7-methylmercapto-4-benzothienyl-N-methylcarbamate
2,3-dihydro-5-chloro-4-benzothienyl-N-methylcarbamate The compounds of this invention can be made using various procedures. A convenient method generally applicable provides for the synthesis of a hydroxybenzothiophene as an intermediate and this compound is then converted to the N-alkyl or N,N-dialkyl carbamates, or the equivalent alkenyl or aryl carbamates, or carbamic acid.

Typically, 4-hydroxybenzothiophene is made according to the multistep synthesis of Fieser and Kennelly (Journal of the American Chemical Society, 57, page 1615, 1935).

The following examples in which parts are by weight, illustrate these syntheses in detail:

*Example 1*

The N-methylcarbamate derivative of the benzothiophene is made as follows: a reaction vessel equipped with a condenser and drying tube is charged with 140 parts 4-hydroxybenzothiophene, 61 parts methyl isocyanate, 1 part dibutyltin diacetate, and 225 parts toluene. The solution is agitated at room temperature for 24 hours using a stirrer. The solution is then chilled and 150 parts of solid product is obtained. This material has a melting point of 129° C. an analyzes as follows:

|  | Theory | Found |
|---|---|---|
| Carbon, wt. percent | 57.9 | 57.8 |
| Hydrogen, wt. percent | 4.4 | 3.8 |
| Nitrogen, wt. percent | 6.8 | 6.8 |

The infrared spectrum of the product is also consistent with the structure 4-benzothienyl-N-methylcarbamate.

The reaction of this example can be illustrated as follows:

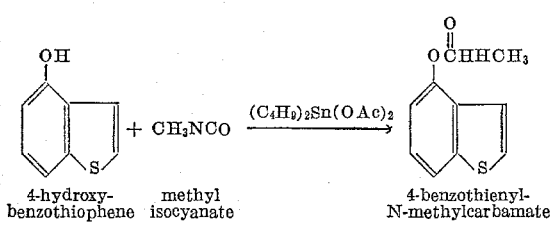

4-hydroxy-benzothiophene + methyl isocyanate → 4-benzothienyl-N-methylcarbamate

Example 2

The product of Example 1 can also be synthesized by the reaction of 4-hydroxybenzothiophene (A) with phosgene (B) in the presence of a base (e.g. alkali metal hydroxides or organic tertiary amines such as pyridine and triethyl amine) to give 4-benzothienyl chloroformate (C) and then the further reaction of this intermediate with methylamine (D) to yield the product 4-benzothienyl-N-methylcarbamate (E). This series of reactions is shown below:

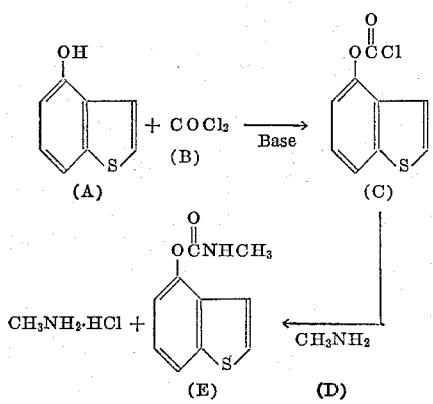

Other amines may be used in place of the methylamine (D) to give other corresponding carbamates, e.g., cyclohexylamine, crotyl amine, allyl amine and the like.

The following is a more detailed description of the process of this example:

To an agitated mixture of 128 parts (1.3 M) of phosgene in 300 parts of toluene is added a solution of 150 parts (1.0 M) of 4-hydroxybenzothiophene and 127 parts (1.05 M) of N,N-dimethylaniline in 600 parts of toluene. The reaction mixture is then stirred at 30° C. for one hour. The mixture is cooled to 20° C. and added slowly to 600 parts of water maintained at 5–10° C. The excess phosgene is thus hydrolyzed and the N,N-dimethylaniline hydrochloride is removed in the aqueous phase. The oily layer is stripped of toluene at reduced pressure and the 4-benzothienyl chloroformate product is purified by distillation.

To a stirred solution of 212 parts (1.0 M) of the 4-benzothienyl chloroformate in 800 parts of toluene is added 310 parts (2 M) of 20 percent aqueous monomethylamine. The reaction mixture is stirred at 10–15° C. for thirty minutes to complete the reaction. The solid product is separated by filtration, washed thoroughly with water to remove all the methylamine hydrochloride, then washed with toluene and air dried. The 4-benzothienyl-N-methylcarbamate so obtained melts at 129° C. The yield is on the order of 90 percent.

Example 3

The N,N-dialkylcarbamates can be made by the reaction of 4-benzothienyl chloroformate (C) (Example 2) with a dialkylamine, such as dimethylamine in place of the methylamine (D) to yield the 4-benzothienyl-N,N-dimethylcarbamate. The reaction conditions are substantially the same as in Example 2.

Example 4

Another method for preparing N-alkyl and N,N-dialkylcarbamates is by the reaction of a hydroxybenzothiophene with the corresponding carbamyl halide. This is illustrated by the reaction of 4-hydroxybenzothiophene and dimethylcarbamyl chloride in the presence of a tertiary organic amine (e.g., triethylamine) dissolved in benzene at a temperature of about 80° C. for 3–4 hours to give a yield of 80–90% 4-benzothienyl-N,N-dimethylcarbamate. This carbamate has a B.P. of 165° C./1.4 mm. and analyzes as follows:

|  | Theory | Found |
|---|---|---|
| Nitrogen, wt. percent | 6.34 | 6.36 |

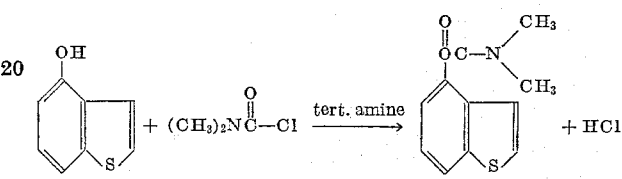

Example 5.—4-benzothienyl-N-ethylcarbamate 4-hydroxybenzothiophene, 15 parts, is dissolved in 35 parts of warm toluene, the solution cooled and treated with 7.8 parts of ethyl isocyanate and 0.03 part of dibutyltin diacetate in a pressure bottle. After several days, 16.0 parts of solid product are recovered by filtration; M.P. 100–102° C.

Analysis.—

|  | Theory | Found |
|---|---|---|
| Nitrogen, wt. percent | 6.45 | 6.38 |

Example 6.—4-benzothienyl-N-butylcarbamate

In a similar manner as described in Example 5, are reacted 11 parts of n-butyl isocyanate and 15 parts of 4-hydroxybenzothiophene. A white solid, M.P. 78–81° C. is obtained.

Analysis.—

|  | Theory | Found |
|---|---|---|
| Nitrogen, wt. percent | 5.62 | 5.78 |

Example 7.—4-benzothienyl-N-phenylcarbamate

In a similar manner as described in Example 5 are reacted 13.1 parts of phenyl isocyanate and 15 parts of 4-hydroxybenzothiophene. A white solid (26 parts) is obtained, M.P. 173° C.

Analysis.—

|  | Theory | Found |
|---|---|---|
| Nitrogen, wt. percent | 5.21 | 5.17 |

Example 8.—4-benzothienyl-N-(m-chlorophenyl)carbamate

In a similar manner as described in Example 5 are reacted 15 parts of 4-hydroxybenzothiophene and 16.9 parts of m-chlorophenyl isocyanate. A white solid (7.5 parts), M.P. 115–117° C. is obtained.

Analysis.—

|  | Theory | Found |
|---|---|---|
| Nitrogen, wt. percent | 4.61 | 4.55 |

Example 9.—4-benzothienyl-N-(p-chlorophenyl)carbamate

In a similar manner as described in Example 5 are reacted 16.9 parts of p-chlorophenyl isocyanate and 15 parts of 4-hydroxybenzothiophene. A white solid (18.9 parts), M.P. 165–166.5° C. is obtained.

*Analysis.—*

|  | Theory | Found |
|---|---|---|
| Nitrogen, wt. percent | 4.61 | 4.69 |

Example 10.—3-benzothienyl-N-methylcarbamate

In a similar manner as described in Example 5 are reacted 2.9 parts of 3-hydroxybenzothiophene and 1.4 parts of methyl isocyanate using hexane as the solvent. A white solid (1 part), M.P. 134° C., is obtained.

*Analysis.—*

|  | Theory | Found |
|---|---|---|
| Nitrogen, wt. percent | 6.76 | 6.73 |

Example 11.—5-benzothienyl-N-methylcarbamate

In a similar manner as described in Example 5 are reacted 19 parts of 5-hydroxybenzothiophene and 8.5 parts of methyl isocyanate, using a benzene-hexane mixture as the solvent. A white solid (23.5 parts), M.P. 126° C., is obtained.

*Analysis.—*

|  | Theory | Found |
|---|---|---|
| Nitrogen, wt. percent | 6.76 | 6.66 |

Example 12.—6-benzothienyl-N-methylcarbamate

In a similar manner as described in Example 5 are reacted 8 parts of 6-hydroxybenzothiophene and 3.5 parts of methyl isocyanate, using benzene as the solvent. A white solid (5.4 parts), M.P. 128.5° C., is obtained.

*Analysis.—*

|  | Theory | Found |
|---|---|---|
| Nitrogen, wt. percent | 6.76 | 6.76 |

Example 13.—7-benzothienyl-N-methylcarbamate

In a similar manner as described in Example 5 are reacted 3.6 parts of 7-hydroxybenzothiophene and 1.6 parts of methyl isocyanate using benzene as the solvent. A white solid (3.3 parts), M.P. 139° C., is obtained.

*Analysis.—*

|  | Theory | Found |
|---|---|---|
| Nitrogen, wt. percent | 6.76 | 6.87 |

Example 14.—4-benzothienyl-N-methylcarbamate-1,1-dioxide

An open vessel is charged with 15 parts 4-benzothienyl-N-methylcarbamate, 105 parts acetic acid and 41 parts 30% hydrogen peroxide. After 84 hours the solution is poured into 350 parts ice water. Upon further cooling 13 parts of product are collected, M.P. 153–156° C. Infrared and ultraviolet spectra are consistent with the structure, 4-benzothienyl - N - methylcarbamate-1,1-dioxide. Recrystallized material, M.P. 158–159° C. (benzene, methanol) analyzes as follows:

|  | Theory | Found |
|---|---|---|
| Carbon, wt. percent | 50.2 | 50.0; 49.9 |
| Hydrogen, wt. percent | 3.8 | 3.9; 3.8 |
| Nitrogen, wt. percent | 5.9 | 5.9 |

The reaction of this example can be illustrated as follows:

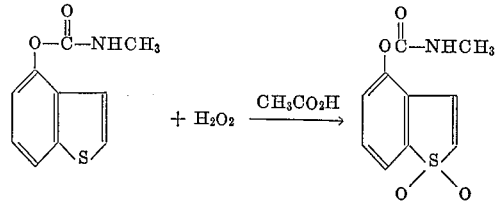

Example 15.—4-benzothienyl-N-cyclopropylcarbamate

A cooled reaction vessel is charged with 11.5 parts phosgene and 52 parts toluene followed by a solution of 12.5 parts 4-hydroxybenzothiophene and 10.5 parts dimethylaniline in 48 parts toluene while keeping the temperature below 20° C. After stirring one hour at 20° C. the mixture is transferred to a reaction vessel previously charged with 50 parts ice water. The mixture is stirred 45 minutes at 10° C. and 30 minutes at room temperature. The top, organic layer is removed, dried over Drierite, and concentrated to 24 parts of a solution of 4-benzothienyl chloroformate in toluene. Vapor phase analysis indicates product of greater than 95% purity.

The toluene solution of 4-benzothienyl chloroformate is charged with 45 parts toluene to a chilled reaction vessel. Cyclopropyl amine, 9.5 parts, in 8.5 parts toluene is charged over a period of 20 minutes with cooling to control the exotherm. After stirring at 10° C. for 20 minutes, the crystalline materials are filtered and triturated with water to remove cyclopropylamine hydrochloride. Dried product, 7 parts, has melting point 97–99° C. Concentration of the filtrate gives an additional 4.8 parts product, M.P. 94–97°. The product analyzes as follows:

|  | Theory | Found |
|---|---|---|
| Carbon | 61.7 | 61.7; 61.7 |
| Hydrogen | 4.8 | 5.1; 5.2 |
| Nitrogen | 6.0 | 6.2; 5.9 |
| Sulfur | 13.7 | 14.1; 13.7 |

The infrared spectrum of the product is consistent with benzothienyl-N-cyclopropylcarbamate.

Example 16.—4,5,6,7-tetrahydro-4-benzothienyl-N-methylcarbamate

In a similar method as described in Example 5 are reacted 14.4 parts of 4-hydroxy-4,5,6,7-tetrahydrobenzothiophene and 5.7 parts of methyl isocyanate, using toluene as the solvent. A white solid (11.5 parts) M.P. 88–89° C., is obtained.

*Analysis.—*

|  | Theory | Found |
|---|---|---|
| Carbon, wt. percent | 56.8 | 57.1 |
| Hydrogen, wt. percent | 6.2 | 6.6 |
| Nitrogen, wt. percent | 6.6 | 6.8 |

Example 17.—7-methyl-4-benzothienyl-N-methylcarbamate

In a similar manner as described in Example 5 are reacted 2 parts of 4-hydroxy-7-methylbenzothiophene and 0.8 part of methyl isocyanate, using toluene as the solvent. A white solid (2 parts), M.P. 141.5–142° C., is obtained.

*Analysis.—*

|  | Theory | Found |
| --- | --- | --- |
| Carbon, wt. percent | 59.7 | 59.5 |
| Hydrogen, wt. percent | 5.0 | 5.6 |
| Nitrogen, wt. percent | 6.3 | 6.2 |

Example 18.—7-methylmercapto-4-benzothienyl-N-methylcarbamate

In a similar manner as described in Example 5 are reacted 2.2 parts of 4-hydroxy-7-methylmercaptobenzothiophene and 0.7 part of the methyl isocyanate, using toluene as the solvent. White solid platelets (2.1 parts) M.P. 121.5–122, are obtained.

*Analysis.—*

|  | Theory | Found |
| --- | --- | --- |
| Carbon, wt. percent | 52.2 | 52.2 |
| Hydrogen, wt. percent | 4.3 | 4.5 |
| Nitrogen, wt. percent | 5.5 | 5.5 |

Example 19.—5-chloro-4-benzothienyl-N-methylcarbamate

In a similar method as described in Example 5 are reacted 4.8 parts of 4-hydroxy-5-chlorobenzothiophene and 1.6 parts of methyl isocyanate, using toluene as the solvent. A solid (4.3 parts), M.P. 127–129° C., is obtained.

*Analysis.—*

|  | Theory | Found |
| --- | --- | --- |
| Carbon, wt. percent | 49.7 | 49.4 |
| Hydrogen, wt. percent | 3.5 | 3.6 |
| Nitrogen, wt. percent | 5.8 | 5.8 |
| Chlorine, wt. percent | 14.7 | 15.0 |

Example 20.—4-benzothienyl-N-propargylcarbamate

In a similar manner as described in Example 2 are reacted 9.7 parts of 4-benzothienyl chloroformate and 5 parts of propargylamine, using toluene as the solvent. A white solid (1.5 parts), M.P. 93–95° C., is obtained.

*Analysis.—*

|  | Theory | Found |
| --- | --- | --- |
| Carbon, wt. percent | 62.3 | 62.4 |
| Hydrogen, wt. percent | 3.9 | 3.9 |
| Nitrogen, wt. percent | 6.1 | 6.0 |

Example 21.—2,3-dihydro-4-benzothienyl-N-methylcarbamate-1,1-dioxide

A solution of 15 parts of 4-benzothienyl-N-methylcarbamate-1,1-dioxide in methyl alcohol is reduced by hydrogen (50 p.s.i.g.) at 25° C. for 1.5 hours, using 10% palladium on charcoal, as catalyst. A white solid (14 parts), M.P. 132.5–134.5° C., is obtained. Infrared and ultraviolet analyses correspond to the desired 2,3-dihydro-4-benzothienyl-N-methyl-carbamate-1,1-dioxide.

*Analysis.—*

|  | Theory | Found |
| --- | --- | --- |
| Carbon, wt. percent | 49.8 | 50.2 |
| Hydrogen, wt. percent | 4.6 | 4.6 |

In general, when using the isocyanate processes of Examples 1, 5–13 and 16-19 or the carbamyl chloride process of Example 4, it is better to use a slight molar excess of 2–10 percent of the isocyanate or carbamyl chloride as compared to the hydroxybenzothiophene in order to insure complete reaction. The reaction temperature is not too critical and can vary from below room temperature, up to 100° C. or higher. However, a reaction temperature of 25° C. to 90° C. has been found to be very satisfactory under most conditions. The reaction can be run below or above atmospheric pressure but a pressure of about 1 atmosphere or slightly above has been found to be very satisfactory. Any inert solvent, such as benzene, toluene, diethyl ether, etc. can be used as the solvent for the isocyanate or carbamyl chloride reaction with the hydroxy intermediates. Tin compounds, such as dibutyltin diacetate and tertiary amines, such as triethylamine or pyridine can be used as catalysts, but the reaction will also proceed in their absence, albeit somewhat more slowly. Likewise, the conditions set forth for the reactions of the examples are not limited to the exact proportions, temperatures, pressures, etc. given therein.

The alkenyl and aryl carbamate compounds are prepared in the same manner as set forth for the alkyl compounds, using the equivalent alkenyl or aryl compounds in place of the alkyl compounds set forth as reactants. Thus, compare Examples 7, 8, 9 and 20 with Example 5. Also, the thiocarbamates of this invention having a —OCSNRR' radical can be formed in the same manner shown above by using the equivalent thio compounds, i.e. by using thioisocyanates, thiophosgene, thiochloroformates or thiocarbamyl halides. These thio compounds have a sulfur atom attached to a carbon atom, instead of the oxygen atom, in the isocyanates, phosgene, chloroformates or carbamyl halides used to prepare carbamates of this invention having the —OCONRR' radical. This invention also includes the partially hydrogenated carbamates, such as the 2,3-dihydrobenzothienyl-carbamates or -thiocarbamates, which can be prepared by selective hydrogenation of the benzothiophene ring.

It will be apparent that the chief intermediate for preparing the carbamates of this invention is a hydroxybenzothiophene compound. As is indicated hereinbefore, a method for making 4-hydrooxybenzothiophene is described by Fieser and Kennelly, supra. This involves four steps: (1) reacting thiophene with succinic acid anhydride to form 3-(2-thenoyl)propionic acid; (2) reduction of this acid to 4-(2-thienyl)butyric acid, as with Zn and HCl; (3) the cyclization to 4-keto-4,5,6,7-tetrahydrobenzothiophene, by converting 4-(2-thienyl)butyric acid to the acid chloride and cyclicizing in presence of stannic chloride; and (4) dehydrogenated the ketone of (3) with sulfur to obtain 4 - hydroxybenzothiophene. Other methods are available to prepare such compounds however.

For example, steps (1) and (2) of the Fieser et al. synthesis can be replaced with other reactions. Thiophene can be reacted with gamma-butyrolactone in the presence of a Friedel-Crafts catalyst to prepare 4-(2-thienyl)butyric acid which can then be subjected to steps (3) with sulfur to obtain 4-hydroxybenzothiophene. pared by the Willgerodt oxidation of thienyl propyl ketone or of butenylthiophene to 4-(2-thienyl)butyramide which in turn can be hydrolyzed to the desired acid. Solvents, such as pyridine, 2-methoxyethanol, ethanol, and isopropanol, can be used in the Willgerodt oxidation. Another method for preparing 4-(2-thienyl)butyric acid is to alkylate 2-thienyl sodium with 1,3-dihalopropane (e.g. 1-bromo-3-chloropropane), followed by reaction with KCN and then by hydrolysis to the acid. Thiophene can be alkylated with gamma-hydroxybutyronitrile to produce 4-(2-thienyl)butyronitrile, which can be hydrolyzed to the acid.

Synthesis routes, other than those using the Fieser et al. cyclization, can be used to prepare hydroxybenzothiophene. 3-benzothienylsulfonyl chloride can be treated with peroxy-trifluoroacetic acid and boron trifluoride to produce 4-hydroxy-3-benzothienylsulfonyl chloride, which can be converted to 4-hydroxybenzothiophene by hydrolytic desulfonation. A thiophyne intermediate can be generated from 3-amino-2-thiophene carboxylic acid or 2,3-diiodothiophene and reacted with furan by Diels-Alder addition, followed by acid catalyzed conversion to 4-hydroxybenzothiophene. Another method involves oxidation of 5-methylbenzothiophene to the corresponding carboxylic acid, which will undergo copper catalyzed oxidation-decarboxylation to provide a hydroxyl group on the carbon atom adjacent to the original carboxyl group site. In other syntheses, orthoethyltoluene or orthoethylcumene is reacted with $H_2S$ to form, respectively, 4-methyl- or 4-isopropyl-benzothiophene. 4-methylbenzothiophene is oxidized to the aldehyde and subjected to a Dakin type oxidation. The 4-isopropylbenzothiopene can be converted to 4-hydroxybenzothiophene by oxidation to the corresponding isopropyl hydroperoxide followed by acid-catlayzed decomposition. In a Wittig olefin type synthesis, 2-thiophene aldehyde is reacted with triphenyl (ethoxycarbonylethyl)phosphonium chloride to form 3-(2-thenylidene)ethyl proprionate, which is converted into 4-hydroxybenzothiophene by vapor phase cyclization. 4-hydroxybenzothiophene can also be prepared by the condensation of 2-thiophene aldehyde and disodium succinate.

The compounds of this invention have been found to exhibit considerable biological activity and are especially potent insecticides when used against important agricultural pests. These compounds may be used in various ways to achieve biological action. They can be applied per se, as solids or in vaporized form, but are preferably applied as the toxic components in pesticidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers and the like. A wide variety of liquid and sold carriers can be used in the pesticidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the compounds of this invention utilized in pesticidal compositions will vary rather widely. It depends to some extent upon the type of composition in which the material is being used, the nature of the condition to be controlled, and the method of application (i.e., spraying, dusting, etc.). In the ultimate pesticidal composition, as applied in the field, carbamate pesticide concentrations as low as 0.0001 weight percent of the total composition can be used. In general, compositions, as applied, containing about 0.05 weight percent pesticide in either liquid or solid carrier give excellent results. In some cases, however, stronger dosages up to about 10 weight percent may be required.

In practice, pesticidal compositions are usually prepared in the form of concentrates, which are diluted in the field to the concentration desired for application. For example, the concentrate can be a wettable powder containing large amounts of a compound of this invention, a carrier (e.g. attapulgite or other clay), and wetting and dispersing agents. Such powders can be diluted prior to application, by dispersing it in water to obtain a sprayable suspension containing the concentration of pesticide desired for application. Other concentrates can be solutions that can be later diluted, e.g. with kerosene. Thus, it is within the contemplation of this invention to provide pesticidal compositions containing up to about 80 percent, by weight of the composition, of a pesticidal compound of this invention. Accordingly, depending upon whether it is ready for application or it is in concentrated form, the contemplated pesticidal compositions contain between about 0.0001 percent and about 80 percent, by weight of the composition, of a pesticidal compound of this invention and a carrier, liquid or solid, as defined hereinbefore.

The following examples illustrate typical pesticidal compositions of several types. Parts are by weight.

*Example 22*

A wettable powder concentrate, that is diluted to desired concentration by dispersing it in water, has the following composition:

| | Parts |
|---|---|
| 4-benzothienyl-N-methylcarbamate | 50 |
| Attapulgite | 47 |
| Mono-calcium salt of polymeric alkylaryl sulfonic acid ("Daxad 21"—dispersant) | 2 |
| Sodium alkylnaphthalene sulfonate ("Nekal BA–75"—wetting agent) | 1 |

*Example 23*

A liquid concentrate that is diluted in the field with kerosene has the following composition:

| | Parts |
|---|---|
| 4-benzothienyl-N-methylcarbamate | 37.6 |
| n-Propanol | 231.7 |
| Cottonseed oil | 32.9 |
| Dimethyl formamide | 65.8 |

*Example 24*

A liquid formulation that is suitable for spray application contains:

| | Parts |
|---|---|
| 4-benzothienyl-N-methylcarbamate | 1 |
| Acetone | 20 |
| Kerosene | 79 |

*Example 25*

Three granular formulations for application against soil insects were prepared. In each case, 53.6 parts 4-benzothienyl-N-methylcarbamate was dissolved in 303 parts acetone to form a spray solution. In one formulation, spray solution was sprayed onto 906 parts Montmorillonite clay (20–40 mesh) and then the solvent was evaporated off. In a second formulation, spray solution was sprayed onto 906 parts corn cob granules and solvent evaporated off. In a third formulation spray solutions was sprayed onto 906 parts ground pecan shells and solvent evaporated off.

The following results are typical of the high activity of the compounds of this invention as used, for instance, against the lepidoptera and coleoptera classes, such as the Southern Armyworm (*Prodenia eridania* Cram.), and Mexican bean beetle (*Epilachna varivestis* Muls.), etc. and as measured by the LD50 value (concentration required to kill 50% of the test insects). In these tests the compounds are formulated as wettable powders and then diluted in water to the concentrations of actual chemical indicated. Reference standards, such as DDT, etc. are formulated in a similar manner:

Cranberry bean plants are dipped in the appropriate concentrations of the respective fomulations and then allowed to dry. Third instar larvae are then caged on the treated plants and maintained under greenhouse conditions for 48 hours following which mortality counts are made. Three replicates are used for each level of application and then the LD50 is calcuated from the dosage mortality figures. The observed data for the compound of this invention and DDT are shown in tabular from below:

| Compound | LD50 in Parts Per Millions | |
|---|---|---|
| | Mexican Bean Beetle | Southern Armyworm |
| 4-benzothienyl-N-methylcarbamate | 2.5 | 40 |
| DDT | 100 | 100 |

The biological activity of a series of these compounds can be demonstrated by the following data:

Compounds: Approximate LD50 in parts per million Mexican bean beetle
- 4-benzthienyl-N,N-dimethylcarbamate _____ 100
- 4-benzothienyl-N-(m-chlorophenylcarbamate) _ 500
- 4-benzothienyl-N-(p-chlorophenylcarbamate) _ 900
- 3-benzothienyl-N-methylcarbamate _____ 100
- 5-benzothienyl-N-methylcarbamate _____ 10
- 6-benzothienyl-N-methylcarbamate _____ 50
- 7-benzothienyl-N-methylcarbamate _____ 5

The 4-benzothienyl-N-methylcarbamate shows activity not only as an insecticide but also for the protectant control of leaf rust of wheat. Cheyenne wheat plants approximately 7 days old are sprayed just short of run-off with an acetone-water mixture containing a wetting agent and 1000 parts per million on a weight basis of 4-benzothienyl-N-methylcarbamate. The plants are allowed to dry and then are inoculated with the parasite Puccinia rubigo-vera. After the chemically treated and untreated plants have been inoculated in a similar fashion they are placed in a moist chamber with a relative humidity of greater than 95 percent. After 16 hours the plants are removed from the moist chamber and placed on the greenhouse bench. The degree of infection is determined approximately 6–7 days later by counting the number of infection loci per plant. Using 1000 p.p.m. of 4-benzothienyl-N-methylcarbamate as a protectant solution, the percent control of the organism Puccinia rubigo-vera was 85 percent. The untreated plants had an average of 151 infection loci per plant.

In general, it has been found that the other compounds of this invention exhibit biological activity and utility. Thus, 4-benzothienyl-N-ethylcarbamate (Example 5) at 1000 p.p.m. gave 82% protection against leaf rust of wheat. 4-benzothienyl-N-butylcarbamate (Example 6) exhibited 47% activity against leaf rust of wheat when tested at 1000 p.p.m. Against the house fly, 4-benzothienyl-N-phenylcarbamate (Example 7) gave 7% control.

In the following tabulation is set forth the percent kill of Mexican bean beetle effected by various other compounds of this invention, when each was tested at a concentration of 1000 p.p.m.:

Percent Kill @ 1000 p.p.m.
Compound: Mexican bean beetle
- 4-benzothienyl-N-methylcarbamate-1,1-dioxide ____ 53
- 4-benzothienyl-N-cyclopropylcarbamate _____ 100
- 4,5,6,7 - tetrahydro - 4 - benzothienyl-N-methylcarbamate _____ 67
- 7-methyl-4-benzothienyl-N-methylcarbamate _____ 100
- 7 - methylmercapto - 4-benzothienyl-N-methylcarbamate _____ 100
- 5-chloro-4-benzothienyl-N-methylcarbamate _____ 100
- 4-benzothienyl-N-propargylcarbamate _____ 100
- 4 - (2,3 - dihydrobenzothienyl)-N-methylcarbamate-1,1-dioxide _____ 100

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:
1. Carbamates of benzothiophenes having the formula:

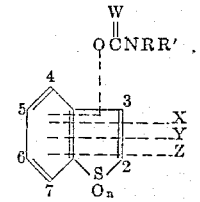

where R is selected from H, alkyl ($C_1$–$C_8$), cycloalkyl ($C_3$–$C_6$), and alkenyl ($C_2$–$C_8$); R' is selected from H, alkyl ($C_1$–$C_8$), alkenyl ($C_2$–$C_8$), phenyl, and chlorophenyl; X, Y, and Z are selected from hydrogen, halogen, nitro, alkyl ($C_1$–$C_4$), alkenyl ($C_2$–$C_4$), di ($C_1$–$C_2$) alkylamino, methylmercapto, cyano (—CN), thiocyano (—SCN), and alkoxy (—$OCH_3$ to —$OC_8H_{17}$); W is selected from O and S; $n$ is 0–2; and in which the carbamate radical (—OCWNRR') and X, Y, and Z may be on any separate 2–7 positions of the ring; and the partially hydrogenated derivatives of said carbamates.
2. 4-benzothienyl-N-methylcarbamate.
3. 4-benzothienyl-N,N-dimethylcarbamate.
4. Alkyl ($C_1$–$C_4$) benzothienyl-N-methylcarbamate.
5. 7-methyl-(4-benzothienyl)-N-methylcarbamate.
6. Methylmercaptobenzothienyl-N-methylcarbamate.
7. 7 - methylmercapto - (4-benzothienyl)-N-methylcarbamate.
8. Halobenzothienyl-N-methylcarbamate.
9. 5-chloro-(4-benzothienyl)-N-methylcarbamate.

References Cited by the Examiner
UNITED STATES PATENTS

| | | | |
|---|---|---|---|
| 2,786,851 | 3/1957 | Mahan | 260—330.5 |
| 3,000,781 | 9/1961 | Feichtinger et al. | 167—33 |
| 3,008,872 | 11/1961 | Goodhue et al. | 167—33 |
| 3,070,606 | 12/1962 | Anderson | 260—330.5 |

LEWIS GOTTS, *Primary Examiner.*

RICHARD L. HUFF, *Assistant Examiner.*

UNITED STATES PATENT OFFICE
CERTIFICATE OF CORRECTION

Patent No. 3,288,808                November 29, 1966

John R. Kilsheimer et al.

It is hereby certified that error appears in the above numbered patent requiring correction and that the said Letters Patent should read as corrected below.

Column 3, lines 4 to 9, for the upper right-hand portion of the formula reading "OCHHCH$_3$" read -- OCNHCH$_3$ --; column 8, line 69, strike out "(3) with sulfur to obtain 4-hydroxybenzothiophene." and insert instead -- (3) and (4). 4-(2-Thienyl)-butyric acid can also be pre- --; column 11, line 6, for "from" read -- form --.

Signed and sealed this 19th day of September 1967.

(SEAL)
Attest:

ERNEST W. SWIDER                        EDWARD J. BRENNER
Attesting Officer                         Commissioner of Patents